United States Patent [19]
Dean

[11] Patent Number: 6,091,970
[45] Date of Patent: Jul. 18, 2000

[54] PSEUDO-OMNIDIRECTIONAL BASE STATION ARRANGEMENT

[75] Inventor: Stuart James Dean, Nepean, Canada

[73] Assignee: Nortel Networks Corporation, Montreal, Canada

[21] Appl. No.: 08/997,782

[22] Filed: Dec. 24, 1997

[51] Int. Cl.[7] .................................................. H04Q 7/30
[52] U.S. Cl. ......................... 455/562; 455/550; 455/552; 455/276.1; 455/424
[58] Field of Search .................................. 455/562, 561, 455/550, 552, 276.1, 524, 403, 425, 424

[56] References Cited

U.S. PATENT DOCUMENTS

| | | | |
|---|---|---|---|
| 4,144,411 | 3/1979 | Frenkiel | 455/562 |
| 5,513,176 | 4/1996 | Dean et al. | 455/562 |
| 5,805,996 | 9/1998 | Salmela | 455/562 |

*Primary Examiner*—Fan S. Tsang
*Assistant Examiner*—Keith Ferguson

[57] ABSTRACT

A base station comprising an arrangement of several directional antennas whose individual azimuthal beam patterns achieve substantially omnidirectional coverage is disclosed. The invention is particularly suitable to telecommunications networks in an initial developmental stage, or to networks deployed in rural areas, both scenarios requiring a low-capacity high-range omnidirectional coverage area. The antennas are generally less conspicuous than a purely omnidirectional antenna achieving the same range, and preferably possess horizontal and vertical polarization ports. In its simplest form, the invention provides a single base station transceiver connected simultaneously to the horizontal polarization port of each antenna. Phase shifters may be inserted in the transmit path for cancellation of nulls in the interference pattern resulting from connection the transceiver to more than one antenna at a time. As capacity demand increases, further transceivers can be added without change to the antenna arrangement. An additional transceiver provides either pseudo-omnidirectional coverage if connected to the vertical polarization port of each antenna or directional coverage if selectively connected to the vertical polarization port of a single antenna. In the latter case, carrier-to-interference information is fed to a beam select module that controls a transmit switch matrix for establishing the selective connection.

18 Claims, 4 Drawing Sheets

PSEUDO-OMNIDIRECTIONAL BASE STATION ARRANGEMENT

FIELD OF THE INVENTION

This invention relates to cellular radio communications systems in general and specifically to a base station antenna arrangement for use in such systems.

BACKGROUND OF THE INVENTION

Cellular radio systems are currently in widespread use throughout the world, providing telecommunications to mobile users. Companies that offer these mobile services, known as telecommunications service providers, generally operate within a given geographic region and frequency band. In order to meet capacity demand, while remaining within the allocated frequency band, the region is usually split into cells, at the center of each of which is a base station that handles communication with mobile stations. Communication channels, each occupying a portion of the allocated frequency band, are distributed among cells such that a given group of channels used in one cell is reused by certain other cells in the network. The distance between the reused cells is planned such that co-channel interference is maintained at a tolerable level.

The relative cost of a base station is usually quite significant, and telecommunications service providers are often interested in keeping infrastructure costs low by minimizing the number of base stations deployed to service a given region or, equivalently, increasing the size of individual cells. It is especially important to minimize infrastructure costs when low-capacity systems are envisaged, as the per capita cost of a base station can be prohibitive. Two realistic low-capacity scenarios in which it is imperative to optimize base station usage are residential or urban initial system roll-out and rural mobile telecommunications.

When a new cellular radio system is deployed in, say, a residential area, initial subscriber penetration can be quite low, and capital costs must be kept to a minimum until the telecommunications service provider has found enough subscribers to finance further investment in base stations. At the same time, providers must offer a decent coverage area so that a significant number of subscribers can be reached. Wide-area coverage with a minimum amount of base stations will therefore be of prime importance in an introductory low-capacity phase of the new network. Clearly, the success of a future high-capacity telecommunications network will ride on the ability to upgrade the initial low-capacity system without replacement of the base station in each cell.

In a rural mobile telecommunications scenario, mobile stations within a cell are usually spaced apart by considerable distances and a standard base station is at no risk of running out of available channels. However, conventional base stations lack the capacity to accommodate occasional new subscribers who might be located beyond present-day cell boundaries, and achieving this without incurring additional costs.

An excellent way to minimize infrastructure costs in both of the above scenarios is to improve the base station antenna technology so as to be able to provide wide-area coverage. A simple approach followed in the prior art consists of using an omnidirectional antenna and boosting the gain in order to increase its range. However, the gain of an omnidirectional antenna providing a significant improvement in range is on the order of 12 decibels (dB) or above, yielding a rather large and unsightly antenna whose installation will likely be objected to. Moreover, any such range increase is offset by a reduction in elevation beamwidth, a side-effect that is acceptable only in the rare case of a geographical area devoid of relief.

Another prior art method of increasing range consists of using several more compact directional antennas, and distributing them so as to cover a complete cell. Such a technique is known as cell sectoring and usually results in a cell being split into three sectors (a tri-sectored cell), although partitioning of a cell into two, four or six sectors is not uncommon practice. However, sectoring as performed in the prior art demands separate base station transceivers for each antenna and corresponding sector, leading to very high costs for a system whose capacity is not fully employed upon installation. Although it may be necessary to sector the cell in the long term to accommodate a growing subscriber base, the front-end expenditures associated with deploying multiple base station transceivers in an initial phase of the network are generally unacceptable.

Furthermore, transceivers at the base station of a given sector are dedicated to that sector, leading to significant levels of trunking inefficiency. In addition, the remainder of the telecommunications network, in particular the mobile switching center with which multiple base stations communicate, treats each sector as a separate cell. Considerable amounts of signalling and processing are therefore required at the base station and the mobile switching center in order to "hand off" a call as a mobile station moves from one sector to another within the same cell. The maximum capacity of a base station in this case is effectively truncated and new, supporting base stations may have to be added before long.

Clearly, no prior art method is capable of significantly increasing the range of a relatively low-capacity base station while keeping infrastructure costs to a minimum.

SUMMARY OF THE INVENTION

It is an object of the present invention to mitigate or obviate one or more disadvantages of the prior art.

Therefore, the present invention can be summarized according to a first broad aspect as a base station for communicating with mobile stations in a telecommunications network, the base station comprising: a plurality of directional antennas mutually spatially arranged such that their beams overlap to provide substantially omnidirectional coverage in azimuth; a transceiver having a transmit port and a main receive port; a first plurality of duplexers connected respectively to the antennas; a splitter connected to the transmit port of the transceiver and having a plurality of output lines connected respectively to the first plurality of duplexers; and a first combiner connected to the main receive port of the transceiver and having a plurality of input lines connected respectively to the first plurality of duplexers.

The present invention can be summarized according to a second broad aspect as a base station for communicating with mobile stations in a telecommunications network, the base station comprising: a plurality of directional antennas mutually spatially arranged such that their beams overlap to provide substantially omnidirectional coverage in azimuth, the antennas each comprising first and second ports; first and second transceivers each having a transmit port, a main receive port and a diverse receive port; a first plurality of duplexers connected respectively to the antennas at the first port; a second plurality of duplexers connected respectively to the antennas at the second port; a first splitter connected to the transmit port of the first transceiver and having a plurality of output lines connected respectively to the first plurality of duplexers; and a second splitter connected to the transmit port of the second transceiver and having a plurality of output lines connected respectively to the second plurality of duplexers; a first combiner connected to the main receive port of the first transceiver and having a plurality of input lines connected respectively to the first plurality of duplexers; and a second combiner connected to the diverse receive port of the first transceiver and having a plurality of input lines connected respectively to the second plurality of duplexers; wherein the main receive port of the second transceiver is connected to one of the main and diverse receive ports of the first transceiver and the diverse receive port of the second transceiver is connected to the other of the main and diverse receive ports of the first transceiver.

The present invention can be summarized according to a third broad aspect as a base station for communicating with mobile stations in a telecommunications network, the base station comprising: a plurality of directional antennas mutually spatially arranged such that their beams overlap to provide substantially omnidirectional coverage in azimuth, the antennas each comprising first and second ports; a first transceiver having a transmit port, a main receive port and a diverse receive port; a second transceiver having a transmit port and a plurality of receive ports; a first plurality of duplexers connected respectively to the antennas at the first port; a second plurality of duplexers connected respectively to the antennas at the second port; a splitter connected to the transmit port of the first transceiver and having a plurality of output lines connected respectively to the first plurality of duplexers; and a first combiner connected to the main receive port of the first transceiver and having a plurality of input lines connected respectively to the first plurality of duplexers; and a second combiner connected to the diverse receive port of the first transceiver and having a plurality of input lines connected respectively to both the second plurality of duplexers and to the plurality of receive ports of the second transceiver; a transmit switch matrix having an input line connected to the transmit port of the second transceiver and a plurality of output lines connected respectively to the second plurality of duplexers; wherein the transmit switch selectively establishes a connection between the transmit port of the second transceiver and one or more of the second plurality of duplexers.

BRIEF DESCRIPTION OF THE DRAWINGS

The preferred embodiment of the present invention will now be described with reference to the following figures, in which.

DETAILED DESCRIPTION OF THE PREFERRED EMBODIMENT

Figure 1A:
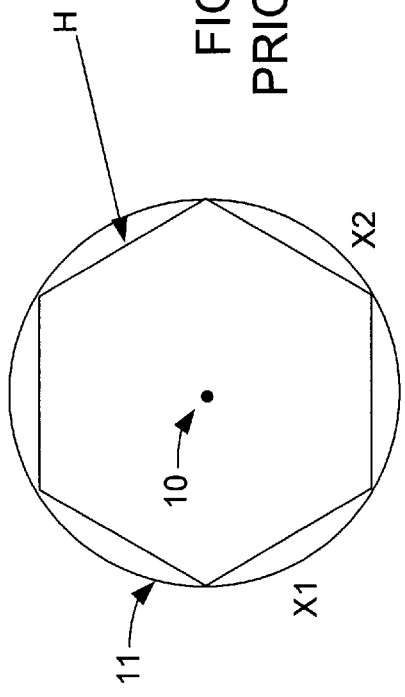
FIG. 1A shows a prior art omnidirectional beam pattern.

In FIG. 1A is shown a typical hexagonal cell, at the center of which is a base station 10 with an antenna arrangement (not shown) producing an omnidirectional beam pattern 11. Two mobile stations X1,X2 are located outside the range of the cell H (and beyond beam pattern 11) and therefore cannot communicate with the base station 10.

Figure 1B:
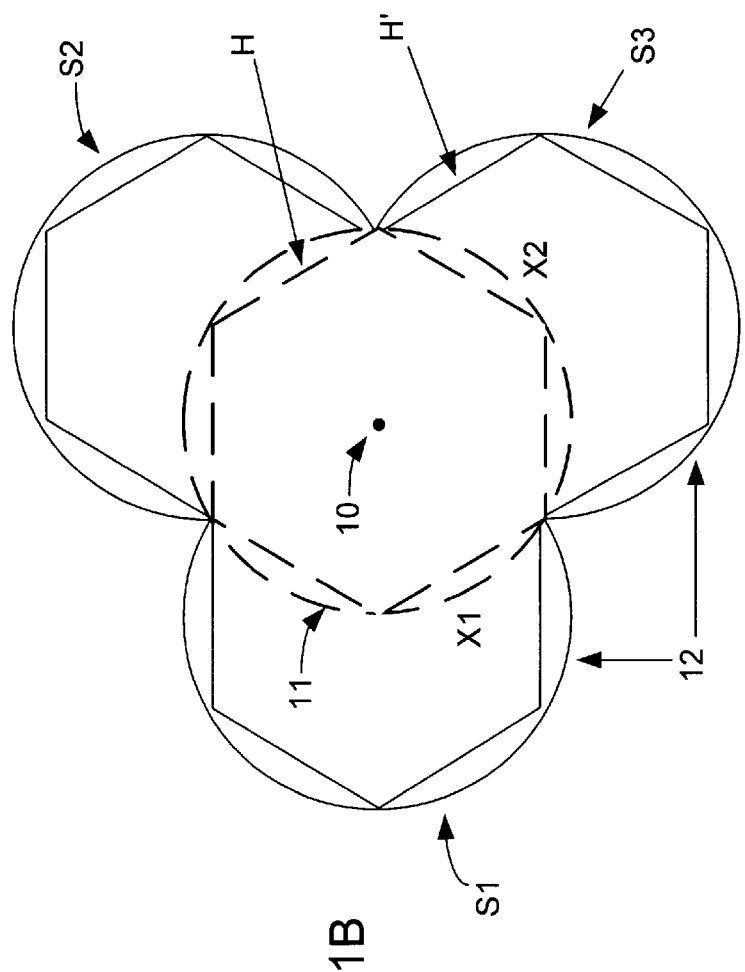
FIG. 1B illustrates a pseudo-omnidirectional beam pattern in accordance with the present invention.

As previously discussed, efforts to increase the range of the omnidirectional antenna arrangement have led to large and unsightly structures with the added disadvantage of a reduced elevation beamwidth; instead, it has proven more fruitful to use directional antennas. In FIG. 1B, the hexagonal cell H is tri-sectored and a prior art arrangement of directional antennas (not shown) and a base station 10 produces a beam pattern 12 broadly divided into sectors S1,S2,S3. Mobile stations X1,X2 are encompassed by beam pattern 12, but the base station 10 in actuality requires three separate radio-frequency (RF) transceivers, thereby rendering this range-increasing solution grossly inefficient.

In accordance with the present invention and described hereinafter, a plurality of directional antennas driven by a single RF transceiver can be used to create the beam pattern 12 that surrounds the base station 10 in an almost omnidirectional fashion, which has given rise to the descriptive term "pseudo-omnidirectional". The effective cell size having increased from H to H', mobile stations X1,X2 are now easily within range of the pseudo-omnidirectional beam pattern 12. It is to be understood, of course, that pseudo-omnidirectional coverage can be achieved with a different number of directional antennas, such as two, four or six.

Figure 2:
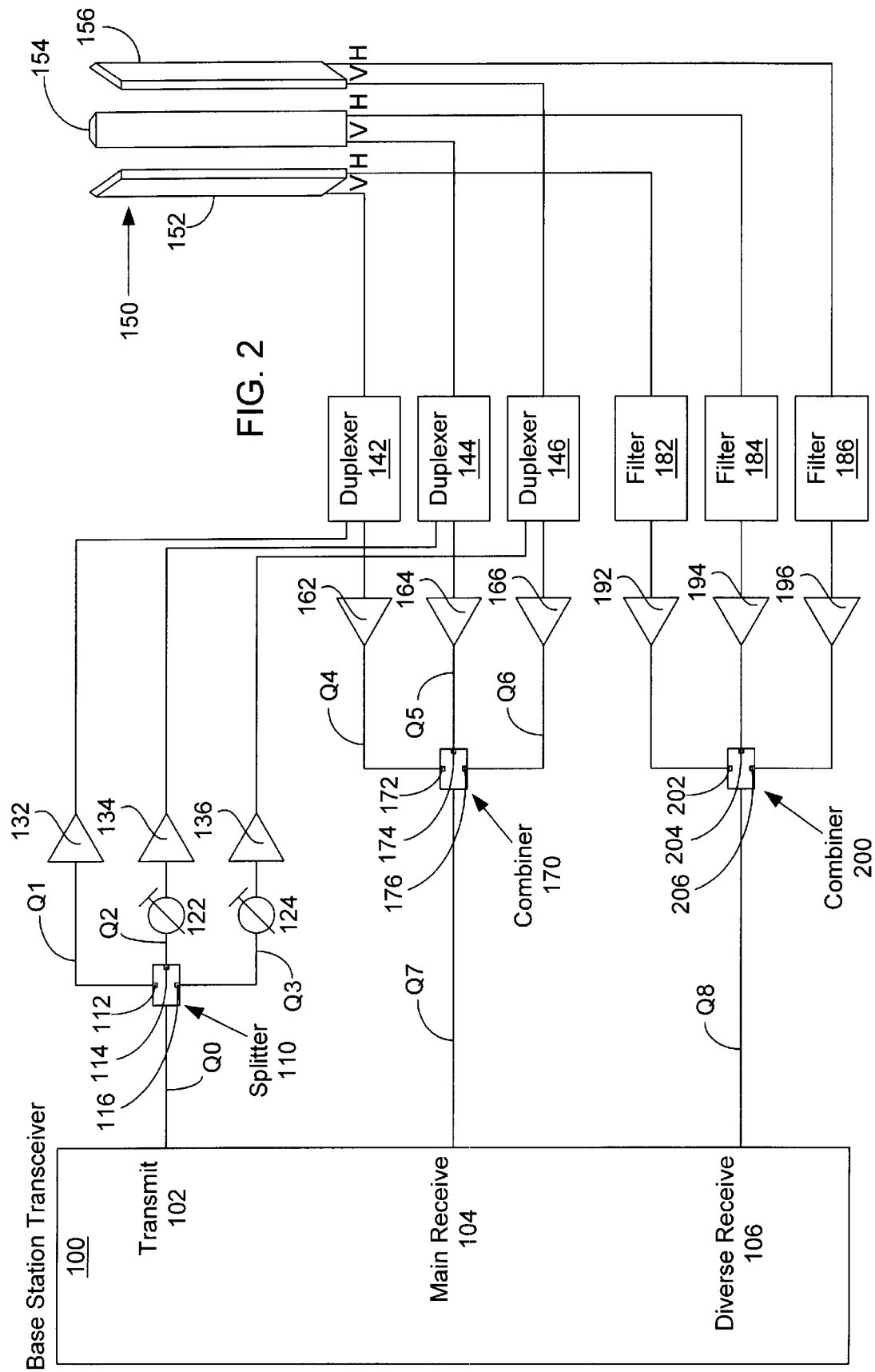
FIG. 2 is a block diagram of a base station in accordance with the preferred embodiment of the present invention.

In order to explain the present invention in more detail, reference is now made to FIG. 2, illustrating a block diagram of a pseudo-omnidirectional base station arrangement comprising a single base station transceiver 100 and an antenna array 150 formed of three dual-ported directional high-gain antennas 152,154,156, each providing approximately 120 degrees of azimuthal coverage. A suitable type of antenna is a so-called dual-slant polarized antenna, comprising in the most general sense two sets of respectively orthogonally polarized antenna elements that are accessed via respective ports. In the illustrated embodiment, the antennas 152,154, 156 are accessed through horizontal and vertical polarization ports, respectively denoted H and V. It is to be understood that the two polarization orientations may be inverted on each antenna without detriment to the functioning of the present invention.

Moreover, full coverage in azimuth can be obtained with three antennas as illustrated or by employing a larger number of antennas when the individual antenna beamwidth is narrower. In other situations, the number of base stations required may be smaller, such as when a base station is placed in a coastal town to serve the parts of the cell on land. It is within the scope of the present invention to use a suitable number of antennas to blanket the desired area.

The transceiver 100 has a transmit output port 102 connected to a power splitter 110 having three outputs 112,114, 116 connected respectively through amplifiers 132,134,136 and duplexers 142,144,146 to the vertical polarization ports V of antennas 152,154 and 156. Preferably, phase shifters 122,124 are inserted between output ports 114,116 of the power splitter 110 and amplifiers 134,136. The transceiver 100 also has a main receive input port 104 connected to a combiner 170 whose three inputs 172,174,176 travel from the vertical polarization ports V of antennas 152,154,156 via duplexers 142,144,146 and low-noise amplifiers 162,164, 166.

A diverse receive input port 106 on the transceiver 100 is connected to a combiner 200 whose three inputs 202,204, 206 stem from respective horizontal polarization ports H of antennas 152,154,156 connected to filters 182,184,186 and low-noise amplifiers 192,194,196. As is known in the art, duplexers play the dual role of combining transmit and receive signals onto a single antenna, along with filtering and isolation of the two signals. Accordingly, duplexers could be employed instead of filters 182,184,186, but are not required.

During transmission, the outputs 112,114,116 of power splitter 110 carry signals Q1,Q2,Q3 that are three times less powerful than a transmit signal Q0 emanating from transmit port 102 of the transceiver 100. Theoretically, since $10 \times \log_{10} 3 = 4.77$, a 4.77 decibel (dB) loss is induced by the power splitter 110, although in practice, it is not uncommon to observe a loss of 5 dB. Phase shifters 122,124 apply a random phase adjustment to signals Q2,Q3 in order to effectively time-average-out nulls in the interference pattern that is created when multiple antennas are connected together. A suitable technique for achieving this has been disclosed in U.S. Pat. No. 5,565,873 (Dean), which is hereby incorporated by reference herein. Signals Q1,Q2,Q3 pass through respective power amplifiers 132,134,136 and duplexers 142,144,146 on their way to vertical polarization ports 152V,154V,156V at the antenna array 150.

During reception, low-noise amplifiers 162,164,166 produce signals Q4,Q5,Q6 which are amalgamated by the combiner 180, creating a receive signal Q7 that is then presented to the main receive port 104 of the transceiver 100. Similarly, low-noise amplifiers 192,194,196 as well as the combiner 200 present the diverse receive port 106 of the transceiver 100 with a receive signal Q8 which has its roots in the horizontal polarization ports H of the antennas 152, 154,156. The transceiver 100 will execute combining algorithms on the receive signals Q7,Q8 in order to extract a clear signal from each mobile station with which the base station is communicating.

A fundamental characteristic of the present invention is its provision of long-range pseudo-omnidirectional cell area coverage using a single base station transceiver and associated RF channel. By way of example, according to the Global System for Mobile Communications (GSM) mobility standard, the first RF channel used by a base station is broken down into eight time slots, among which one is reserved for control information and the remaining seven accommodate a total of seven telephone calls. As capacity demand (and consequently revenues) increase, more transceivers can be added and RF channels allocated to accommodate the larger number of users without the need for antenna re-engineering at the base station site. In a GSM network, additional RF channels do not require respective control channels, and each extra transceiver therefore increases base station capacity by a total of eight telephone calls. In a similar fashion, mobile networks based on Advanced Mobile Phone Service (AMPS), Time-Division Multiple Access (TDMA), Code-Division Multiple Access (CDMA) or Time-Division Duplex (TDD) technologies stand to benefit from the inventive base station arrangement.

Figure 3:
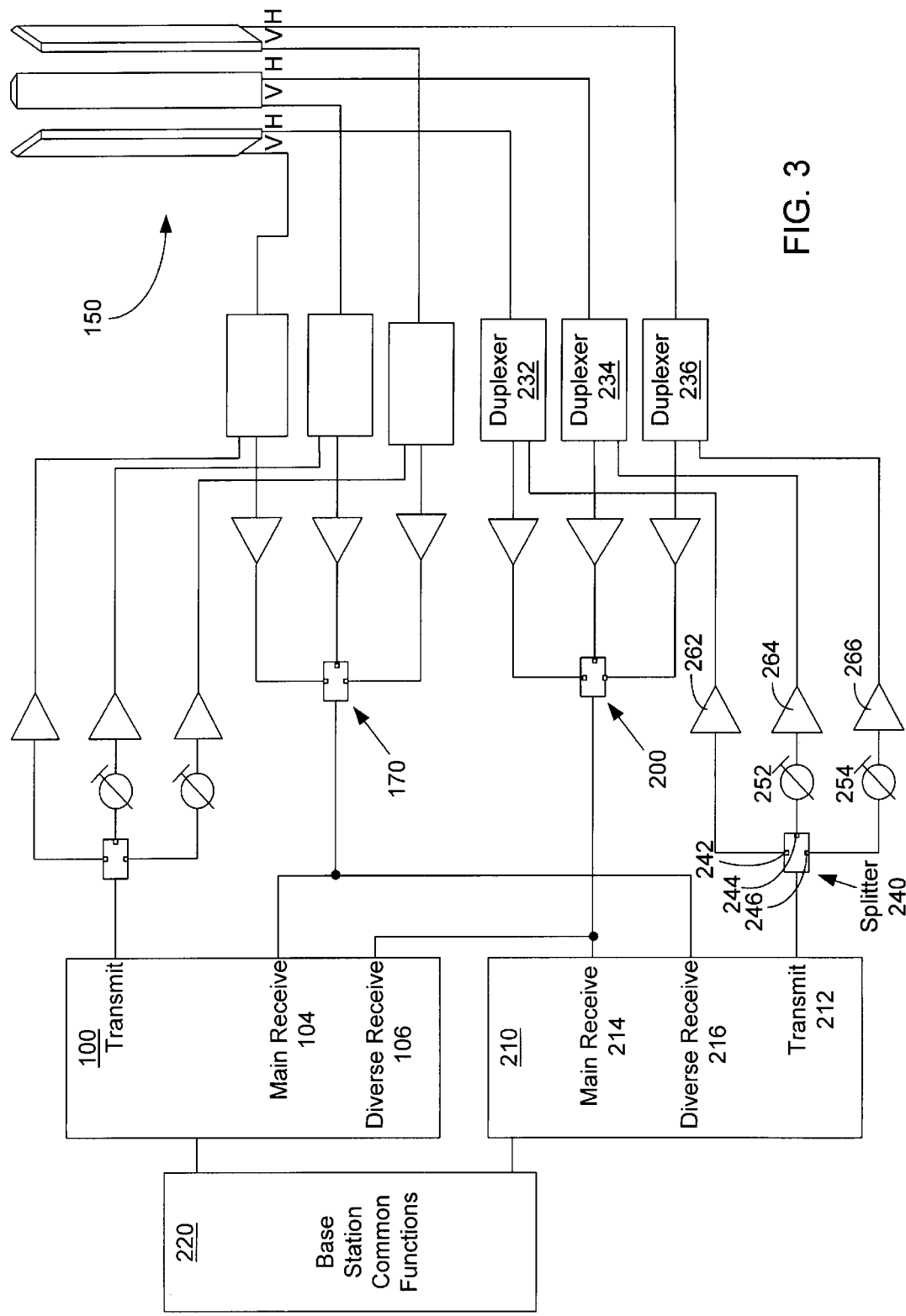
FIG. 3 is a block diagram of a base station with an additional transceiver in accordance with another embodiment of the present invention.

It is of value to describe an embodiment of the present invention following the addition of a second transceiver to increase capacity. Accordingly, FIG. 3 shows a base station arrangement with two identical transceivers 100,210 along with the well-known antenna array 150. A common functions block 220 performs basic signal processing and interfaces with the transceivers 100,210 and with the remainder of the network. As in FIG. 2, the combiners 170,200 are respectively connected to the main and diverse receive ports 104,106 of transceiver 100. On the other hand, the filters 182,184,186 in FIG. 2 have been replaced by duplexers 232,234,236 in FIG. 3.

The transceiver 210 also has a transmit port 212, a main receive port 214 and a diverse receive port 216. The transmit port 212 is connected to a power splitter 240 whose three outputs 242,244,246 are connected to the respective horizontal polarization ports H of antennas 152,154,156 via amplifiers 262,264,262 and duplexers 232,234,236. Again, phase shifters 252,254 are optionally inserted between output ports 244,246 of the power splitter 240 and amplifiers 264,266.

The main and diverse receive ports 214,216 are respectively fed by combiners 200 and 170, an arrangement noted as being the inverse of the connection arrangement at the main and diverse receive ports 104,106 of transceiver 100. It is to be understood that this inversion is not necessary, and that the present invention will function as intended if the outputs of combiners 170,200 are respectively connected to the main and diverse receive input ports 214,216 of transceiver 210.

In operation, communication takes place over two RF channels, one for each transceiver 100,210. Two overlapping pseudo-omnidirectional beam patterns are cast by the three antennas and, for a GSM network, fifteen rather than seven mobile stations located anywhere within the far-reaching limits of the beam patterns can communicate with the base station.

Figure 4:
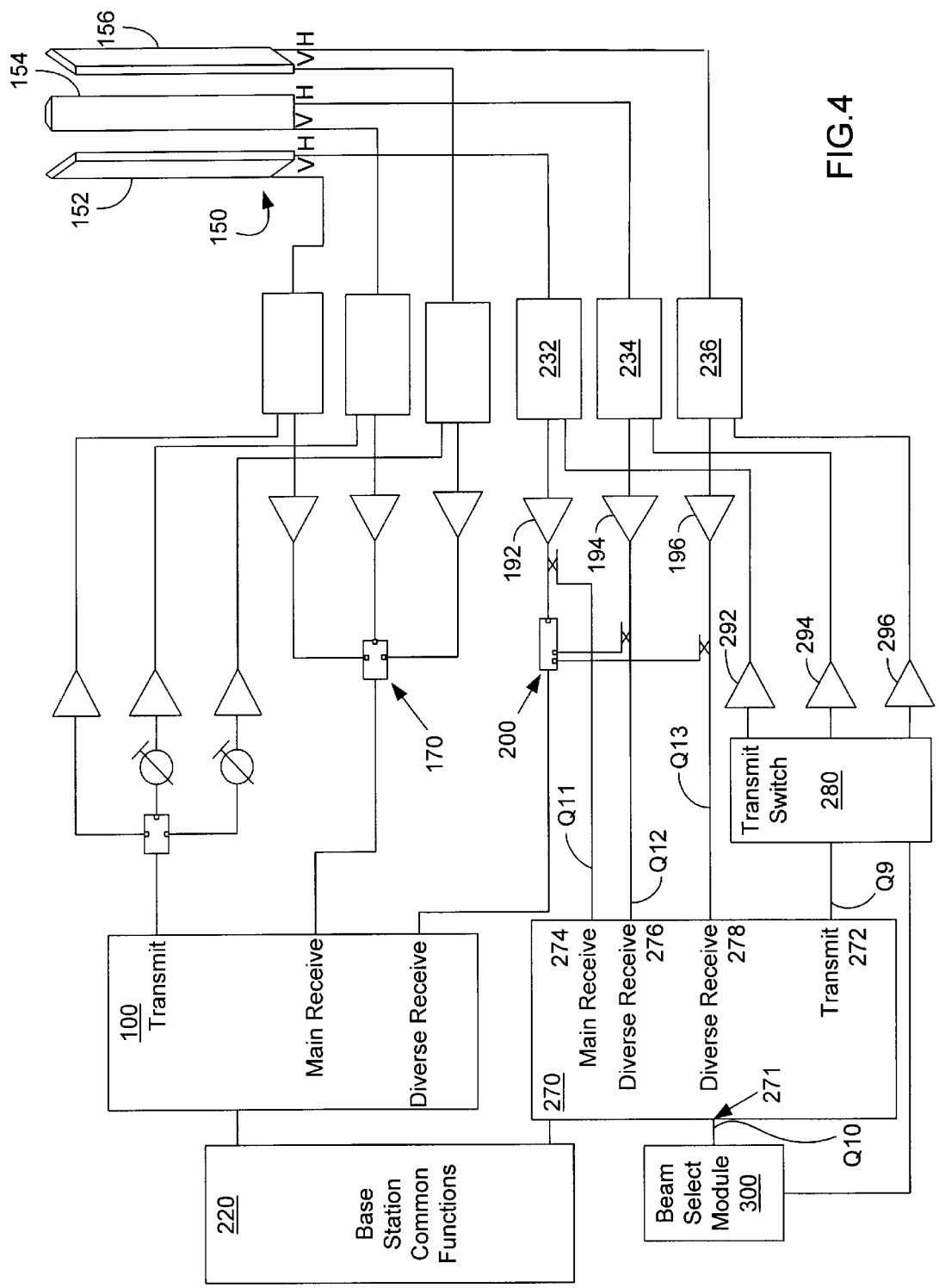
FIG. 4 is a block diagram of a base station with an additional transceiver in accordance with a further embodiment of the present invention.

Still further modifications are possible, whereby the horizontal polarization ports are used in unison to cast a pseudo-omnidirectional beam and, in addition, the vertically polarized ports are employed to create a long-range directional beam in only one of three sectors. Accordingly, FIG. 4 presents a block diagram of a base station comprising the familiar antenna array 150 and common functions block 220 along with two transceivers 100,270, of which transceiver 100 has been borrowed from FIGS. 2 and 3. The manner in which transceiver 100 is connected to the antennas 152,154, 156 is identical to the way in which transceiver 100 of FIG. 3 is connected.

Transceiver 270, on the other hand, is equipped with a transmit port 272 connected to a transmit switch matrix 280 providing connection with the horizontal polarization port H of one of the three antennas 152,154,156 via respective amplifiers 292,294,296 and duplexers 232,234,236. It is noteworthy that neither a power splitter nor phase shifters are required, as only one antenna is ever transmitted to by transceiver 270 at any given time. The transceiver 270 also comprises a beam select output port 271 which, together with transmit switch matrix 280, is connected to a transmit beam select module 300. Moreover, transceiver 270 possesses three receive ports 274,276 and 278, each connected to the horizontal polarization port H of a respective antenna 152,154,156 via respective amplifiers 192,194,196 and duplexers 232,234,236.

The operation of transceiver 100 is identical to that of FIGS. 2 and 3. In contrast, transceiver 270 generates a transmit signal Q9 on the transmit port 272 and a beam select signal Q10 on the beam select output port. The beam select signal normally comprises information such as carrier-to-interference ratio which is derived from receive signals Q11,Q12 and Q13 present at the receive ports 274,276,278 of transceiver 270.

The beam select signal Q10 is fed to the beam select module 300 which executes a direction-finding algorithm to identify a desired sector for transmission, and subsequently instructs the transmit switch matrix 280 to connect transmit signal Q9 to the horizontal polarization port H of the antenna corresponding to the desired sector.

The ensuing beam pattern of the inventive base station during transmission, therefore, resembles 12 of FIG. 1B, combining a high-gain directional beam pattern from transceiver 270 and a lower-gain pseudo-omnidirectional beam pattern from transceiver 100. This allows transmission to mobile stations beyond the boundaries of a traditional cell. As for reception, this is generally not a problem, since far-reaching receive beam patterns can be cast due to the availability of receive signals from all three directional antennas.

Clearly, the embodiment in FIG. 4 permits easy appendage of additional transceivers identical to transceiver 270, thereby increasing the capacity of the system. Given four RF channels, and therefore enough capacity for managing thirty-one users in a GSM network, one transceiver could handle mobile stations within the boundaries of the pseudo-omnidirectional beam pattern, and the other three transceivers could each be dedicated to a particular sector and RF channel. In such a scenario, the transmit switch matrix 280 must be enhanced to route each transmit signal to the appropriate power amplifier.

It has been shown that the effective size of an omnidirectional cell can be increased to accommodate users outside the original cell while employing a minimum number of RF channels and constraining antenna dimensions to within reasonable limits. While the preferred embodiment of the invention and several alternative configurations have been described and illustrated it will be apparent to one skilled in the art that variations in the design may be made. The scope of the invention, therefore, is only to be limited by the claims appended hereto.

I claim:

1. A base station for communicating with mobile stations in a telecommunications network, the base station comprising:
    a plurality of directional antennas mutually spatially arranged such that their beams overlap to provide substantially omnidirectional coverage in azimuth, the antennas each comprising first and second ports;
    first and second transceivers each having a transmit port, a main receive port and a diverse receive port;
    a first plurality of duplexers connected respectively to the antennas at the first port;
    a second plurality of duplexers connected respectively to the antennas at the second port;
    a first splitter connected to the transmit port of the first transceiver and having a plurality of output lines connected respectively to the first plurality of duplexers; and
    a second splitter connected to the transmit port of the second transceiver and having a plurality of output lines connected respectively to the second plurality of duplexers;
    a first combiner connected to the main receive port of the first transceiver and having a plurality of input lines connected respectively to the first plurality of duplexers; and
    a second combiner connected to the diverse receive port of the first transceiver and having a plurality of input lines connected respectively to the second plurality of duplexers;
    wherein the main receive port of the second transceiver is connected to one of the main and diverse receive ports of the first transceiver and the diverse receive port of the second transceiver is connected to the other of the main and diverse receive ports of the first transceiver.

2. A base station according to claim 1, further comprising a plurality of phase shifters connected respectively in some of the output lines of the first splitter.

3. A base station according to claim 1, further comprising a plurality of phase shifters connected respectively in some of the output lines of the second splitter.

4. A base station according to claim 1, wherein the first and second ports of each antenna are respectively horizontal and vertical polarization ports.

5. A base station according to claim 1, wherein the first and second ports of each antenna are respectively vertical and horizontal polarization ports.

6. A base station for communicating with mobile stations in a telecommunications network, the base station comprising:
    a plurality of directional antennas mutually spatially arranged such that their beams overlap to provide substantially omnidirectional coverage in azimuth, the antennas each comprising first and second ports;
    a first transceiver having a transmit port, a main receive port and a diverse receive port;
    a second transceiver having a transmit port and a plurality of receive ports;
    a first plurality of duplexers connected respectively to the antennas at the first port;
    a second plurality of duplexers connected respectively to the antennas at the second port;
    a splitter connected to the transmit port of the first transceiver and having a plurality of output lines connected respectively to the first plurality of duplexers; and
    a first combiner connected to the main receive port of the first transceiver and having a plurality of input lines connected respectively to the first plurality of duplexers; and
    a second combiner connected to the diverse receive port of the first transceiver and having a plurality of input lines connected respectively to both the second plurality of duplexers and to the plurality of receive ports of the second transceiver;
    a transmit switch matrix having an input line connected to the transmit port of the second transceiver and a plurality of output lines connected respectively to the second plurality of duplexers;
    wherein the transmit switch selectively establishes a connection between the transmit port of the second transceiver and one or more of the second plurality of duplexers.

7. A base station according to claim 6, further comprising a beam select module, wherein the second transceiver provides carrier-to-interference data to the beam select module, wherein the beam select module controls the transmit switch according to the carrier-to-interference data.

8. A base station according to claim 6, further comprising a plurality of phase shifters connected respectively in some of the output lines of the first splitter.

9. A base station according to claim 6, wherein the first and second ports of each antenna are respectively horizontal and vertical polarization ports.

10. A base station according to claim 6, wherein the first and second ports of each antenna are respectively vertical and horizontal polarization ports.

11. A base station for communicating with mobile stations in a telecommunications network, the base station comprising:

a plurality of directional antennas mutually spatially arranged such that their beams overlap to provide substantially omnidirectional coverage in azimuth, the antennas comprising first and second ports;

a transceiver having a transmit port, a main receive port and a diversity receive port;

a plurality of duplexers connected respectively to the antennas at the first port;

a splitter connected to the transmit port of the transceiver and having a plurality of output lines connected respectively to the plurality of duplexers;

a first combiner connected to the main receive port of the transceiver and having a plurality of input lines connected respectively to the plurality of duplexers;

a plurality of filters connected respectively to the antennas at the second port; and a second combiner connected to the diverse receive port of the transceiver and having a plurality of input lines connected respectively to the plurality of filters.

12. A base station according to claim 11, further comprising a plurality of phase shifters connected respectively in some of the output lines of the splitter.

13. A base station according to claim 11, wherein the first and second ports of each antenna are respectively horizontal and vertical polarization ports.

14. A base station according to claim 11, wherein the first and second ports of each antenna are respectively vertical and horizontal polarization ports.

15. A base station for communicating with mobile stations in a telecommunications network, the base station comprising:

a plurality of directional antennas mutually spatially arranged such that their beams overlap to provide substantially omnidirectional coverage in azimuth, the antennas comprising first and second ports;

a transceiver having a transmit port, a main receive port and a diversity receive port;

a first plurality of duplexers connected respectively to the antennas at the first port;

a splitter connected to the transmit port of the transceiver and having a plurality of output lines connected respectively to the first plurality of duplexers;

a first combiner connected to the main receive port of the transceiver and having a plurality of input lines connected respectively to the first plurality of duplexers;

a second plurality of duplexers connected respectively to the antennas at the second port; and a second combiner connected to the diverse receive port of the transceiver and having a plurality of input lines connected respectively to the second plurality of duplexers.

16. A base station according to claim 15, further comprising a plurality of phase shifters connected respectively in some of the output lines of the splitter.

17. A base station according to claim 15, wherein the first and second ports of each antenna are respectively horizontal and vertical polarization ports.

18. A base station according to claim 15, wherein the first and second ports of each antenna are respectively vertical and horizontal polarization ports.

* * * * *